United States Patent [19]

Tanaka et al.

[11] 3,950,609
[45] Apr. 13, 1976

[54] FACSIMILE SYSTEM

[75] Inventors: Yutaka Tanaka, Kadoma; Sumio Ogawara, Tokyo, both of Japan

[73] Assignees: Matsushita Electric Industrial Co., Ltd.; Matsushita Graphic Communication Systems, Inc., both of Japan

[22] Filed: Mar. 28, 1974

[21] Appl. No.: 455,874

[30] Foreign Application Priority Data

Mar. 30, 1973  Japan.................................. 48-37193

[52] U.S. Cl. ................. 178/6; 178/6.8; 178/DIG. 3
[51] Int. Cl.²........................................... H04N 3/32
[58] Field of Search..................... 178/DIG. 3, 6, 6.8

[56] References Cited
UNITED STATES PATENTS

| 3,646,256 | 2/1972 | Jacob..................................... 178/6 |
| 3,670,099 | 6/1972 | Oliver..................................... 178/6 |

*Primary Examiner*—Robert L. Griffin
*Assistant Examiner*—Edward L. Coles
*Attorney, Agent, or Firm*—Robert E. Burns; Emmanuel J. Lobato; Bruce L. Adams

[57] ABSTRACT

A two-valued object field is scanned and stored on a line-by-line basis and sequentially read out on a block-by-block basis. Each block has an equal number of signal components each representing the light values of the two-valued object found along a line path. Means are provided for encoding the signal blocks to produce a first code when the signal components are entirely at white level, a second signal when the signal components are entirely at black level, and a third signal when the signal components are of a mixture of black and white levels. The first and second codes are transmitted while the respective signal components are inhibited. The third signal is transmitted followed by the associated signal components.

10 Claims, 3 Drawing Figures

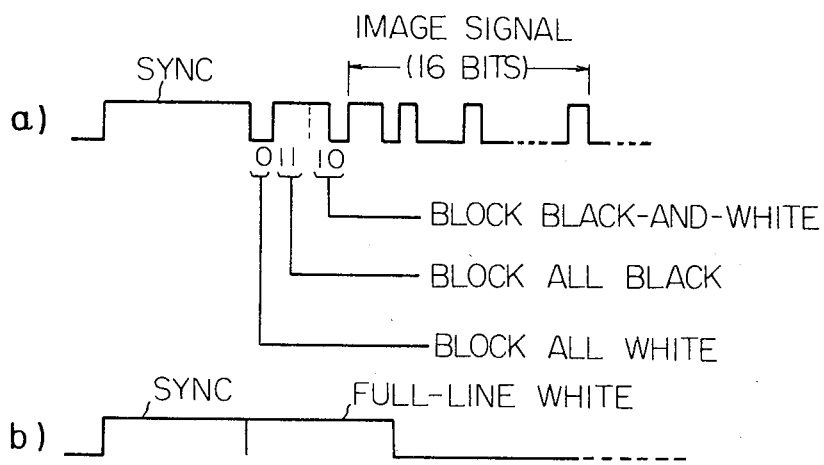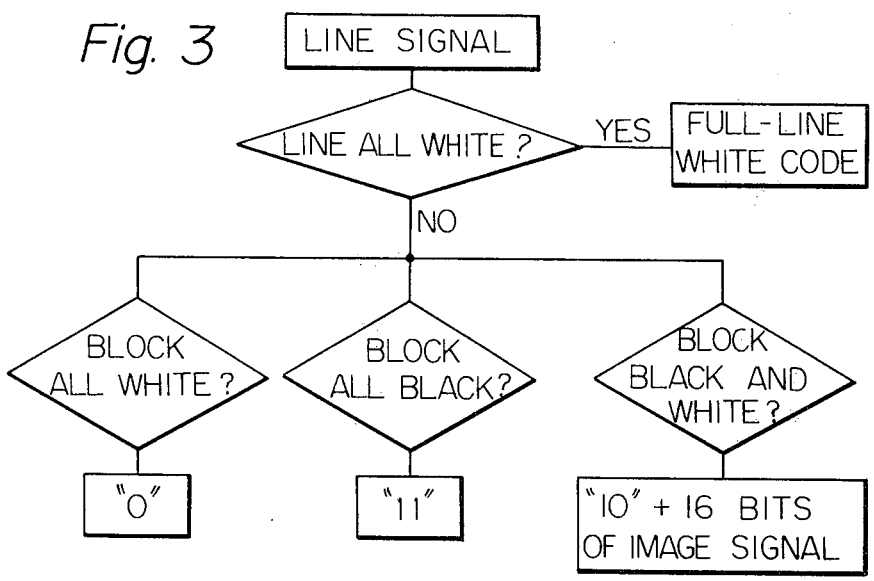

FACSIMILE SYSTEM

The present invention relates to facsimile communications and more particularly to the transmission of coded and noncoded facsimile signals having a reduced bandwidth-time product.

Progress in facsimile and related fields has developed to such an extent that signals derived from text or pictorial matter may now be economically and accurately transmitted from one location to another. Although the advances in these fields have made possible the development of systems having relatively low cost, ease of operation, and reliability, there remains the need for an increase in the speed of transmission and a reduction in the bandwidth required to satisfactorily transmit a facsimile signal.

In one prior approach to the time-bandwidth reduction, run-length coding facsimile has been proposed wherein a single line path of a two-valued object is repeatedly scanned to produce a sequence of signals representative of runs of white or black lengths, the signals being encoded into binary form and transmitted over conventional switched telephone networks. However, the inherent noises occuring in the telephone lines could often lead to a complete failure at the distant end of the line in recognizing the received signal, and a signal in a full line path would be completely disturbed to the detriment of the quality of received material.

The recent reduction in equipment cost, particularly memory devices has made possible the application thereof to facsimile systems. In conjunction with a digital line scanner, a buffer storage may advantageously be employed for coding a scanned image signal.

The principal object of the present invention is to reduce the deleterious effect by the noise on the transmission line by the relative reduction in the number of coded signals by dividing a full-line image signal into blocks of equal length and transmitting a mixture of coded and noncoded signals.

In accordance with the present invention, there is provided a facsimile system for transmitting signals representative of the discrete light values of a two-valued object field over a narrow band channel. The invention is comprised, at a transmitter station, of image scanning means, means including the image scanning means for developing an image signal consisting of first and second discrete values of a two-valued object found along a line path of said field, memory means for storing the signal components, means for sequentially reading out signal blocks of equal length from said memory means, a first encoder translating the signal blocks for producing a first code when signal components in the read out block are entirely of said first discrete value, the first code inhibiting the entirely first valued signal block from transmission, a second encoder translating the signal blocks for producing a second code when signal components in the read out block are of a mixture of the first and second value signal components, means for gating the mixture of first and second value signal components immediately after the second code has been produced, means for transmitting the codes and the gated signal components to a receiver station, and, at the receiver station, means for reconstituting a sequence of incoming signals into a visual image.

A preferred embodiment of the present invention will now be described by way of example with the accompanying drawings, in which:

FIG. 2 is a graphic representation of signal waveforms; and

FIG. 3 is a flow chart showing the sequence of circuit actions.

Figure 1:
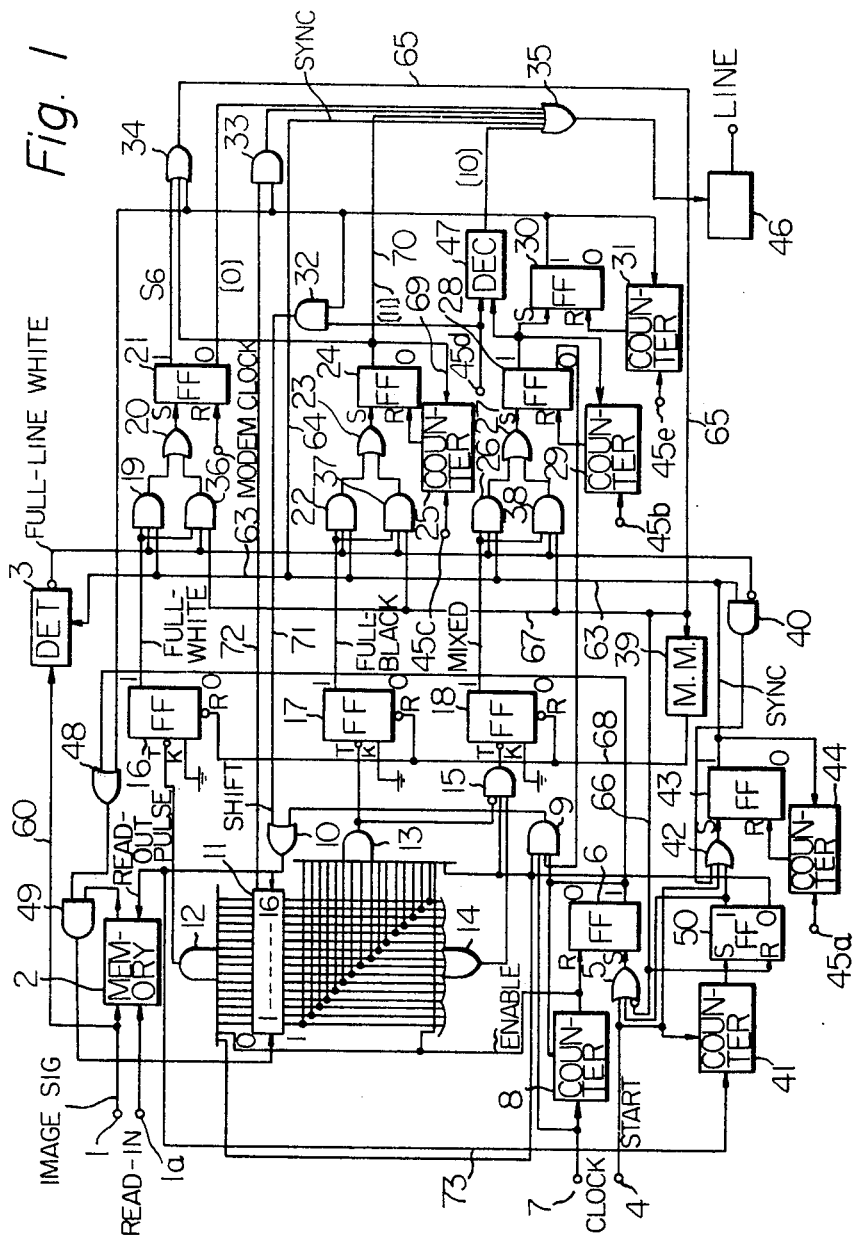
FIG. 1 is a schematic circuit block diagram embodying the present invention.

Referring now to the drawings, and particular to FIG. 1, wherein a circuit diagram embodying the present invention is schematically shown. A textual or pictorial material is scanned by a line scanner (not shown) of a well known digital solid-state type or an analog cathode ray tube type and an image signal consisting of signal components or binary bits at white and black levels representative of the light values of the two-valued object found along a line path of the textual material, is generated and applied to the image signal input terminals 1, 1a and fed into a buffer memory 2 having a memory capacity of, for example, 2048 bits (which equals 16 bits × 128 blocks). The scanned line image signal is thus stored in the form of a binary signal representing equivalent 2048 black or white picture elements contained in a single line. Simultaneously with this, the image signal is applied on lead 60 to a full-line white detector 3 which produces a signal when the signal components contained in the image signal are at the white level. The full-line white signal inhibits the associated circuits coupled to the output circuit of the detector 3 as will be described later. A start signal is also applied to start-signal input terminals 4 and changes the state of flip-flop 6 from the normal reset condition to the energized set condition by way of OR gate 5. With the "1" output of the flip-flop 6 being energized, a 16-bit counter 8 is activated to start counting clock pulses applied to terminals 7. Upon counting of 16 clock pulses, the flip-flop 6 is again caused to reset. Therefore, the flip-flop 6 is energized by means of the counter 8 for a period of 16 clock pulses. The "1" output of the flip-flop 6 energizes an AND gate 9 to pass the 16 bits of clock pulses therethrough to the read-out terminal of the 2048-bit buffer storage 2 by way of OR gate 10 and also to a shift register 11 to permit transfer of a block of 16 bits of visual information from the buffer storage 2 to the shift register 11. It is seen that clock pulses are utilized as shift pulses for transfer of the stored bits from the buffer storage to the shift register. Signal processing will proceed with the now transferred block of 16 bits of visual information clocked into the register. The signal processing will follow different sequences of processing steps depending on the register 11 contents, or the binary bits of information; that is, if the 16 bits are entirely at white or black level, or at mixed levels of black and white. Assuming that the 16 bits are entirely at the white level, an AND gate 12 will be energized at the instant all the 16 bits are clocked into the shift register 11 with an enable pulse applied from counter 8. A flip-flop 16 is caused to change its state from the reset to set contitions and the "1" output thereof goes high. On the other hand, the start pulse applied on terminals 4 energizes by way of an OR gate 42 a flip-flop 43 to change its state from the reset to set condition. With the "1" output of flip-flop 43 being energized, a counter 44 is brought into action and starts counting the modem clocks applied to terminal 45a. The modem clock is a pulse of a repetition rate lower than the normal clock pulses applied to the terminal 7 and at which rate the facsimile signals are transmitted to a receiver station. After a predetermined number of modem clocks has been counted, the counter 44 changes the state of flip-flop 43 to the rest condition. It is seen that the pulse derived from the output of flip-flop 43 is a pulse which can also be used as a synchronizing pulse as will be described later, and which pulse has a duration a predetermined number of times greater than the interval of each binary bit. The synchronizing pulse is applied on leads 63 and 64 to a modem (modulator-demodulator) equipment 46 by way of OR gate 35 onto a transmission channel. With the output circuits of detector 3 and flip-flop 16 being energized as described above, the sync pulse is passed through AND gate 19 and sets flip-flop 21 through OR gate 20. The flip-flop 21 is reset by modem clock pulses and thus the output pulse derived from the "1" output circuit of flip-flop 21 has a pulse length equal to the pulse spacing of the modem clocks, and its complementary output is produced at the "0" output thereof and through OR gate 35 is transmitted over the transmission channel by way of the modem 46 (FIG. 2). Simultaneously with the transmission of an all-16-bit white signal ("0"), the pulse obtained at the output circuit "1" of flip-flop 21 is transmitted through OR gate 34 on lead 65 to a monostable multivibrator 39 which produces a pulse at the leading edge of the applied pulse and clears the flip-flops 16, 17 and 18 over lead 68. The pulse on lead 65 is also applied on lead 66 to change the state of flip-flop 6 through OR gate 5 to enable the counter 8 to start counting the clock pulses again as previously described with reference to start pulse applied to terminals 7. While a 16-bit count is made by the counter 8, clock pulses are passed through AND gate 9 through OR gate 10 to serve as shift pulses for the shift register 11 in the same manner as previously described. The previous all white bit information is thus emptied from the shift register, but inhibited by AND gate 33 which remains disabled under this condition. The next 16 bits of image information now stored in the memory 2 are read out by the same pulse enabled by AND gate 9 and through AND gate 49 and are clocked into the shift register 11. Thus the shift register is loaded with a next block of 16 bits. The previously described pulse on lead 65 from flip-flop 21 is also applied on lead 67 to AND gates 36, 37 and 38 in preparation for the next processing step for the now transferred block in the shift register 11.

Assuming that the next block is entirely at the black level, an AND gate 13 is energized to change the state of flip-flop 17 while inhibiting AND gate 15 to which is also applied an output from OR gate 14. The flip-flop 17 energizes AND gate 37 and through OR gate 23 changes the state of flip-flop 24 producing an output on lead 69 to energize a counter 25 which is caused to starting counting two bits of modem clocks. Upon counting of the two modem clocks, the counter 25 resets the flip-flop 24 and deenergizes the "1" output of the flip-flop 24. Therefore, a pulse of a duration of two modem clocks appears on lead 70 as a code "11" which is applied through OR gate 35 to the modem 46 for transmission. The same pulse energizes OR gate 34 to transfer the next block from the buffer memory to the shift register 11 at the repetition rate of the higher rate clock pulses applied to terminal 7. The previous full black bits in the shift register are inhibited by AND gate 33 in the same manner as described above.

Assuming that the next block is a mixture of black and white levels, AND gate 15 is energized through OR gate 14 to change the state of flip-flop 18, and then flip-flop 28 through AND gate 38 and OR gate 27. Similarly, a two-bit counter 29 is activated by the "1" output of flip-flop 28 to produce a pulse of the two-bit duration on the output circuit of the flip-flop 28, the pulse being recognized as a code indicating "11" and translated into a code "10" by decoder 47. The code "10" indicates that the block now in the shift register is a mixture of binary bits of black and white level and transmitted through OR gate 35 to a receiver station. A flip-flop 30 having its set terminal coupled to the output of flip-flop 28 produces a "1" output at the trailing edge of the code "11" from flip-flop 28 to energize a 16-bit counter 31 which counts the modem clocks. After the counting, the flip-flop 30 is reset by the counter 31. Therefore, the flip-flop 30 retains its set condition for the period of 16 bits of modem clocks. Modem clocks on terminal 45d are thus passed through AND gate 32 during this period and applied on lead 71 to the OR gate 10 as shift pulses to deliver the stored binary bits from the shift register 11 at the modem clock rate through lead 72 to AND gate 33 which remains energized during the same period by the enable signal from flip-flop 30. The gated signal is transmitted through modem 46 to the receiver station preceded by the above-mentioned code "10". Therefore, while the sixteen bits of binary levels are being delivered from the shift register 11, the next sixteen bits of information are transferred thereto from the buffer memory 2 at the modem clock rate.

At the start of each line scanning, a synchronizing pulse is produced and transmitted to the receiver station as described above. While the sync pulse is being transmitted, an image signal of the scanned line is loaded into the buffer memory 2 by the read-in clocks on terminal 1a. If the full-line signal is entirely at the white level, the detector 3 produces a full-line white signal at the trailing edge of the sync pulse applied on lead 63 and inhibits AND gates 19, 36, 22, 37, 26, and 38, and energizes AND gate 40 to change the state of flip-flop 43 by way of OR gate 42. The flip-flop 43 again produces an output immediately after the trailing edge of the sync pulse and energizes the counter 44 to count a predetermined number of modem clocks applied on terminal 45a, the predetermined number being any number to permit the output pulse to be recognized as a full-line white signal. In this embodiment, the full-line white signal has the same pulse length as the sync pulse and appears at the trailing edge of the preceding sync pulse (FIG. 2).

A 2048-bit counter 41 is connected to the shift register 11 so that it counts the number of shift pulses passed on lead 73 and, at 2048 bits of a instant the full-line signal are transmitted, the counter 41 applies a line end signal to flip-flop 50 to apply a synch-transmit signal to the flip-flop 43. The flip-flop 50 restores its normal state by a reset pulse supplied from AND gate 34 when the last code of the line path is transmitted so that the next sync pulse is produced. While flip-flop 50 was under the set condition, the "0" output terminal thereof provides an inhibit signal to AND gates 9, 15, 13, and 12.

AND gates 22 and 26 are for passing the full-block black and black-and-white signals, respectively, to the flip-flops 24 and 28 when these signals appear immediately following a pulse.

Since the procedure at the receiver station is the inverse of that at the transmitter station, the operation of the corresponding is similar to that described above.

The foregoing description shows only preferred embodiment of the present invention. Various modifications are apparent to those skilled in the art without departing from the scope of the present invention which is only limited by the appended claims. Therefore, the embodiment shown and described are only illustrative, not restrictive.

What is claimed is:

1. In a visual communication system of the type having a line scanner in which a visual image of a two-valued object field is scanned and converted into a series of line signals each comprising a predetermined number of first-valued and second-valued binary bits representative of the light values of said image, the improvement which comprises, at a transmitter station, memory means for storing said binary bits, means for sequentially reading out blocks of equal numbers of binary bits from said memory means, a first encoder receptive of said read out binary bits for translating each said block into a first code when all the bits of said block are of said first-valued binary bits, a second encoder receptive of said read out blocks for translating each said block into a second code when the bits of said block are of a mixture of said first-valued and second-valued binary bits, a third encoder receptive of said read out blocks for translating each said block into a third code when all of the bits of said block are of said second-valued binary bits, means receptive of each said block for selectively gating the binary bits of said block of mixed-valued bits for transmission upon the occurrence of said second code, and means for transmitting said codes and said gated binary bits in sequence as they occur and, at a receiver station, means for converting a sequence of incoming signals comprised of a sequence of said codes and said gated binary bits into an optical image corresponding to the visual image.

2. A visual communication system as claimed in claim 1, wherein the number of binary bits in said line signal is 2048 and the number of binary bits in each said block is 16.

3. A visual communication system as claimed in claim 1, further comprising a fourth encoder coupled to said line scanner at said transmitter for translating said predetermined number of binary bits into a fourth code when all of said binary bits are of said first-valued binary bit.

4. A visual communication system as claimed in claim 3, wherein said first, second and third encoders include means responsive to said fourth code for disabling the respective encoders.

5. A visual communication system as claimed in claim 1, wherein said reading out means comprises a shift register coupled to said memory means, means for supplying said shift register with clock pulses to transfer the binary bits from said memory means to said shift register, and means coupled to said supplying means for counting a number of said clock pulses equal to the number of bits in each said block to control the transfer of said binary bits.

6. A visual communication system as claimed in claim 5, further comprising means for generating second clock pulses of a repetition rate lower than that of said first clock pulses, and wherein said second clock pulses are enabled when said third code is produced so that a signal block of a mixture of said first and second discrete value of signal components is gated out at said repetition rate.

7. A visual communication system as claimed in claim 5, further comprising second counting means coupled to said clock pulse supply means for counting said clock pulses and means for generating a synchronizing pulse upon counting a member of said clock pulses equal to said predetermined number of said first and second binary bits.

8. A visual communication system as claimed in claim 5, comprising means for transferring the binary bits in said memory means at a first rate when said first and third codes are generated and at a second rate lower than said first rate when said second code is generated.

9. A visual communication system as claimed in claim 8, wherein said codes and said gated binary bits are transmitted at said second rate.

10. A facsimile transmitter of the type having a scanner in which a visual image of a two-valued object field is scanned and converted into a series of line signals each comprising a predetermined number of first-valued and second-valued binary bits representative of the light values of said image, comprising, memory means for storing said binary bits, means for sequentially reading out blocks of equal numbers of bits from said memory means, a first encoder receptive of said read out blocks of bits for translating each said block into a first code when all the contents of said block are of said first-valued binary bits, a second encoder receptive of said read out blocks for translating each said block into a second code when the bits of said block are of a mixture of said first-valued and second-valued binary bits, a third encoder receptive of said read out blocks for translating each said block into a third code when all the bits of said block are of said second-valued binary bit, means receptive each said block for selectively gating the bits of said block of mixed-valued bits for transmission upon the occurrence of said second code, and means for transmitting said codes and said gated binary bits in sequence as they occur.

* * * * *